(12) United States Patent
Laird et al.

(10) Patent No.: US 10,315,482 B2
(45) Date of Patent: Jun. 11, 2019

(54) METHODS AND APPARATUS FOR SUSPENDING VEHICLES

(71) Applicant: Fox Factory, Inc., Scotts Valley, CA (US)

(72) Inventors: Andrew Laird, Los Gatos, CA (US); Sante M. Pelot, Freedom, CA (US); William M. Becker, Aptos, CA (US); Dennis K. Wootten, Scotts Valley, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

(21) Appl. No.: 15/597,875

(22) Filed: May 17, 2017

(65) Prior Publication Data

US 2017/0246927 A1    Aug. 31, 2017

Related U.S. Application Data

(63) Continuation of application No. 14/849,143, filed on Sep. 9, 2015, now Pat. No. 9,656,531, which is a
(Continued)

(51) Int. Cl.
*B60G 17/052* (2006.01)
*B62K 25/08* (2006.01)
(Continued)

(52) U.S. Cl.
CPC ............ *B60G 17/052* (2013.01); *B60G 11/27* (2013.01); *B60G 17/048* (2013.01); *B62K 25/08* (2013.01);
(Continued)

(58) Field of Classification Search
CPC .... B60G 17/052; B60G 17/048; B60G 11/27; B60G 2202/152; B60G 2300/12;
(Continued)

(56) References Cited

U.S. PATENT DOCUMENTS

| 2,173,574 A | * | 9/1939 | Binder | ................... F16F 9/48 |
| | | | | 188/287 |
| 3,525,512 A | | 8/1970 | Hagwood | |

(Continued)

FOREIGN PATENT DOCUMENTS

| EP | 0855533 | 7/1998 |
| EP | 1655158 | 5/2006 |

(Continued)

OTHER PUBLICATIONS

European Search Report for EP Application No. 09166412, 7 pages, dated Nov. 4, 2009 (Nov. 4, 2009).
(Continued)

*Primary Examiner* — Vishal R Sahni (57) ABSTRACT

A method and apparatus for a shock absorber for a vehicle having a gas spring with first and second gas chambers, wherein the first chamber is utilized during a first travel portion of the shock absorber and the first and second chambers are both utilized during a second portion of travel. In one embodiment, a travel adjustment assembly is configured to selectively communicate a first gas chamber with a negative gas chamber.

16 Claims, 9 Drawing Sheets

Related U.S. Application Data continuation of application No. 13/751,879, filed on Jan. 28, 2013, now Pat. No. 9,150,075, which is a continuation-in-part of application No. 12/407,610, filed on Mar. 19, 2009, now Pat. No. 8,894,050.

(60) Provisional application No. 61/591,565, filed on Jan. 27, 2012, provisional application No. 61/157,541, filed on Mar. 4, 2009, provisional application No. 61/038,015, filed on Mar. 19, 2008.

(51) Int. Cl.

| | | |
|---|---|---|
| *B60G 17/048* | (2006.01) | |
| *F16F 9/48* | (2006.01) | |
| *F16F 9/06* | (2006.01) | |
| *F16F 9/02* | (2006.01) | |
| *F16F 9/46* | (2006.01) | |
| *B60G 11/27* | (2006.01) | |

(52) U.S. Cl.
CPC .......... *F16F 9/0209* (2013.01); *F16F 9/0236* (2013.01); *F16F 9/063* (2013.01); *F16F 9/46* (2013.01); *F16F 9/48* (2013.01); *F16F 9/486* (2013.01); *B60G 2202/152* (2013.01); *B60G 2300/12* (2013.01); *B60G 2500/2064* (2013.01); *B60G 2500/22* (2013.01); *B60G 2600/21* (2013.01)

(58) Field of Classification Search
CPC ........ B60G 2500/22; B60G 2500/2064; B60G 2600/21; F16F 9/48; F16F 9/486; F16F 9/063; F16F 9/0209; F16F 9/0236; F16F 9/46; B62K 25/08
USPC ........... 188/284, 285, 289; 267/64.14, 64.15, 267/64.18, 64.22, 64.25, 64.26, 64.28
See application file for complete search history.

(56) References Cited

U.S. PATENT DOCUMENTS

| | | | |
|---|---|---|---|
| 3,991,863 A * | 11/1976 | Lee | F16F 9/44 188/289 |
| 4,445,671 A * | 5/1984 | Reuschenbach | F16F 9/06 108/147 |
| 4,453,638 A | 6/1984 | Wallace | |
| 4,813,655 A * | 3/1989 | Hennells | F16F 9/43 137/102 |
| 4,881,750 A | 11/1989 | Hartmann et al. | |
| 4,915,364 A | 4/1990 | Perlini | |
| 4,972,928 A | 11/1990 | Sirven | |
| 5,190,126 A * | 3/1993 | Curnutt | F16F 9/06 188/269 |
| 5,207,300 A | 5/1993 | Engel et al. | |
| 5,293,968 A | 3/1994 | Schuelke et al. | |
| 5,417,446 A | 5/1995 | Pileggi et al. | |
| 5,509,674 A | 4/1996 | Browning | |
| 5,509,675 A | 4/1996 | Barnett et al. | |
| 5,511,811 A | 4/1996 | Pileggi | |
| 5,538,276 A | 7/1996 | Tullis | |
| 5,649,692 A | 7/1997 | Gilsdorf et al. | |
| 5,725,226 A | 3/1998 | Cabrerizo-Pariente et al. | |
| 5,775,677 A * | 7/1998 | Englund | B60G 13/06 188/317 |
| 5,799,758 A * | 9/1998 | Huang | A63B 21/0083 188/285 |
| 6,095,541 A | 8/2000 | Turner et al. | |
| 6,105,988 A | 8/2000 | Turner et al. | |
| 6,135,434 A | 10/2000 | Marking | |
| 6,311,962 B1 | 11/2001 | Marking | |
| 6,360,857 B1 * | 3/2002 | Fox | F16F 9/3485 188/281 |
| 6,371,263 B1 | 4/2002 | Hoose et al. | |
| 6,450,304 B1 | 9/2002 | Miller et al. | |
| 6,543,754 B2 | 4/2003 | Ogura | |
| 6,592,136 B2 | 7/2003 | Becker et al. | |
| 6,752,388 B2 | 6/2004 | Thurow et al. | |
| 6,938,887 B2 | 9/2005 | Achenbach | |
| 6,978,872 B2 | 12/2005 | Turner | |
| 7,000,907 B2 | 2/2006 | Achenbach | |
| 7,083,163 B2 | 8/2006 | Lemmens et al. | |
| 7,163,222 B2 | 1/2007 | Becker et al. | |
| 7,195,234 B2 | 3/2007 | Jordan et al. | |
| 7,308,976 B2 | 12/2007 | Turner | |
| 7,413,064 B2 | 8/2008 | Furuya et al. | |
| 7,703,585 B2 | 4/2010 | Fox | |
| 7,810,826 B2 | 10/2010 | McAndrews et al. | |
| 8,118,144 B2 | 2/2012 | Turner et al. | |
| 8,123,006 B1 | 2/2012 | Schroeder et al. | |
| 8,167,328 B2 | 5/2012 | Powell et al. | |
| 8,256,787 B2 | 9/2012 | Inoue et al. | |
| 8,276,719 B2 | 10/2012 | Trujillo et al. | |
| 8,448,761 B2 | 5/2013 | Shipman et al. | |
| 8,894,050 B2 | 11/2014 | Wootten et al. | |
| 9,656,531 B2 | 5/2017 | Laird et al. | |
| 2002/0108825 A1 | 8/2002 | Miller et al. | |
| 2002/0121416 A1 | 9/2002 | Katayama et al. | |
| 2002/0190445 A1 | 12/2002 | Achenbach et al. | |
| 2003/0029684 A1 | 2/2003 | Forster et al. | |
| 2003/0132073 A1 | 7/2003 | Nakadate et al. | |
| 2003/0234144 A1 * | 12/2003 | Fox | B62K 25/04 188/278 |
| 2005/0062249 A1 | 3/2005 | Lemmens et al. | |
| 2006/0011432 A1 | 1/2006 | Turner et al. | |
| 2006/0266602 A1 | 11/2006 | Robertson | |
| 2007/0057420 A1 | 3/2007 | Jordan et al. | |
| 2007/0119670 A1 | 5/2007 | Fox | |
| 2007/0227845 A1 | 10/2007 | Fox et al. | |
| 2007/0262501 A1 | 11/2007 | Cheever et al. | |
| 2008/0023935 A1 | 1/2008 | McAndrews et al. | |
| 2008/0053767 A1 | 3/2008 | Fox et al. | |
| 2008/0106012 A1 | 5/2008 | Turner et al. | |
| 2008/0116622 A1 | 5/2008 | Fox | |
| 2008/0296814 A1 | 12/2008 | Franklin et al. | |
| 2009/0001684 A1 | 1/2009 | McAndrews et al. | |
| 2009/0140475 A1 | 6/2009 | Turner et al. | |
| 2009/0236807 A1 | 9/2009 | Wootten et al. | |
| 2009/0277732 A1 | 11/2009 | Trujillo et al. | |
| 2010/0044975 A1 | 2/2010 | Yablon et al. | |
| 2010/0244340 A1 | 9/2010 | Wootten et al. | |
| 2011/0215550 A1 | 9/2011 | Shirai | |
| 2011/0215551 A1 | 9/2011 | Galasso et al. | |
| 2012/0325605 A1 | 12/2012 | Talavasek et al. | |
| 2013/0134687 A1 | 5/2013 | Laird et al. | |

FOREIGN PATENT DOCUMENTS

| | | |
|---|---|---|
| GB | 942328 | 11/1963 |
| GB | 1099734 A | 1/1968 |
| GB | 1500714 A | 2/1978 |
| JP | 2006177493 A | 7/2006 |

OTHER PUBLICATIONS

European Search Report for EP Application No. 12174239, 8 pages, dated Nov. 22, 2012 (Nov. 22, 2012).

European Exam Report for EP Application No. 12174239, 6 pages, dated May 25, 2018 (May 25, 2018), May 25, 2018.

* cited by examiner

METHODS AND APPARATUS FOR SUSPENDING VEHICLES

CROSS-REFERENCE TO RELATED APPLICATIONS

This application claims priority to and is a continuation of the co-pending patent application, U.S. patent application Ser. No. 14/849,143, filed on Sep. 9, 2015, entitled "METHODS AND APPARATUS FOR SUSPENDING VEHICLES", by Andrew Laird et al., and assigned to the assignee of the present invention, the disclosure of which is hereby incorporated herein by reference in its entirety.

The U.S. patent application Ser. No. 14/849,143 claims priority to and is a continuation of the patent application, U.S. patent application Ser. No. 13/751,879, filed on Jan. 28, 2013, now U.S. Pat. No. 9,150,075, entitled "METHODS AND APPARATUS FOR SUSPENDING VEHICLES", by Andrew Laird et al., and assigned to the assignee of the present invention, the disclosure of which is hereby incorporated herein by reference in its entirety.

The U.S. patent application Ser. No. 13/751,879 claims priority to and benefit of U.S. Provisional Patent Application No. 61/591,565, filed on Jan. 27, 2012, entitled "METHODS AND APPARATUS FOR SUSPENDING VEHICLES" by Andrew Laird et al., which is incorporated herein, in its entirety, by reference.

The U.S. patent application Ser. No. 13/751,879 is a continuation-in-part application of and claims the benefit of U.S. patent application Ser. No. 12/407,610, filed on Mar. 19, 2009, and is now issued U.S. Pat. No. 8,894,050, entitled "METHODS AND APPARATUS FOR SUSPENDING VEHICLES" by Dennis K. Wootten et al., and assigned to the assignee of the present application, which is incorporated herein, in its entirety, by reference.

The U.S. patent application Ser. No. 12/407,610 claims priority to and benefit of U.S. Provisional Patent Application No. 61/038,015, filed on Mar. 19, 2008, entitled "METHODS AND APPARATUS FOR SUSPENSION VEHICLES USING MULTIPLE FLUID VOLUMES" by Dennis K. Wootten et al., which is incorporated herein, in its entirety, by reference.

The U.S. patent application Ser. No. 12/407,610 claims priority to and benefit of U.S. Provisional Patent Application No. 61/157,541, filed on Mar. 4, 2009, entitled "METHODS AND APPARATUS FOR COMBINED VARIABLE DAMPING AND VARIABLE SPRING RATE SUSPENSION" by Dennis K. Wootten et al., which is incorporated herein, in its entirety, by reference.

BACKGROUND OF THE INVENTION

Field of the Invention

Embodiments of the invention generally relate to methods and apparatus for use in vehicle suspension. Particular embodiments of the invention relate to methods and apparatus useful for variable spring rate and/or variable damping rate vehicle suspension.

Description of the Related Art

Vehicle suspension systems typically include a spring component or components and a damping component or components. Frequently those discrete components are separately mounted on a vehicle. Traditionally, mechanical springs, such as metal leaf or helical springs, have been used in conjunction with some type of viscous fluid based damping mechanism mounted functionally in parallel. More recently, compressed gas acting over a piston area has replaced mechanical springs as the spring component in some contemporary suspension systems. While compressed gas springs are usually lighter and more compact than their mechanical counterparts, the compression and expansion curve and corresponding spring rate, are not linear and become particularly exponential beyond a mid range of gas compression.

As such, the force (corresponding to pressure acting on a given piston area) versus the linear travel or displacement of the air spring is not linear. While a gas spring force curve approximates linearity during an initial portion of travel, the last portion of travel is exponential. The shock absorber is therefore increasingly more rigid in the last portion of its stroke.

Accordingly, there is a need for a shock absorber that uses a multiple volume gas spring under a variety of loads and/or under a variety of travel settings.

SUMMARY OF THE INVENTION

The present invention generally comprises a shock absorber for a vehicle having a gas spring with first and second gas chambers, wherein the first chamber is utilized during a first travel portion of the shock absorber and the first and second chambers are both utilized during a second portion of travel. In one embodiment, a travel adjustment assembly is configured to selectively communicate a first gas chamber with a negative gas chamber.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In this disclosure the term "air" is used interchangeably with the term "gas" unless otherwise stated. Both terms generally indicate a compressible fluid. One embodiment comprises an air spring shock absorber for a vehicle. In one embodiment the vehicle is a bicycle. In one embodiment the shock absorber is a bicycle or motorcycle front fork leg. The terms "shock absorber" and "front/leg" will each include all terms and unless an embodiment is expressly excluded, embodiments hereof are equally applicable to all. The air spring is advantageous because it includes at least two sequentially activated gas spring chambers that operate to increase the effective gas volume of the spring, at least one communication valve for opening a fluid flow path between the chambers, and a fill valve for selectively applying gas pressure within the chambers. In one embodiment, the fluid path between the chambers is opened using a mechanically actuated valve and in another embodiment, a diameter change or "bypass" type valve opens the fluid path between the chambers. In yet another embodiment, the fluid path is opened solely by gas pressure developed in the first chamber.

In one embodiment, the multiple gas chamber spring can further include and operate in conjunction with a damper. In one embodiment the damper comprises a viscous fluid that is isolated from the compressible spring fluid. Such viscous fluid may be isolated or distanced from the fluid spring in various ways. In one embodiment, such isolation may be facilitated by placing the damper component in one leg of a fork and the spring component in the other. A relevant feature of the isolation mechanism is that the damping fluid and the spring fluid are not co-located in the same dynamic volume. By providing some degree of isolation or separation between the damping and spring fluids, which are often liquid and gas respectively, the formation of emulsion is avoided or greatly delayed. In one embodiment, the combined versatility of an adjustable or "tunable" damper and the multi-chamber spring result in a shock absorber having a selectively variable force versus travel versus velocity curve (e.g., 3-d surface as plotted). In yet other embodiments, the multi-chamber air spring is utilized to improve the overall performance of a shock absorber having a damper with automatic and user adjustable "blow off" features.

A piston in cylinder type suspension gas spring preferably includes enough gas volume so that the gas compression curve, for a corresponding suspension system, remains substantially linear over a portion of the stroke (e.g. first ⅔rds) of the suspension system. Because pressure due to gas compression increases exponentially, simple gas springs, as a practical matter, have spring rates that are often too low over the first half of the stroke and too high over the second half. Because the spring rate is initially too low, the initial gas pressure in a gas spring shock absorber must be set high to yield a usable shock absorber (e.g. one that is not too soft). Unfortunately such a shock absorber, as it is compressed, becomes quickly very stiff and allows little "settle" or "sag" when the shock initially loaded. Because proper initial "sag" improves vehicle ride and handling, lack of proper "sag" can negatively affect handling characteristics of a vehicle. Embodiments described herein extend the substantially linear portion of the spring rate curve beyond that represented by a single chamber and therefore allow for higher initial pressure settings without overly accelerating the onset of unusable stiffness during compression.

As vehicle use becomes more extreme, there is a need for increased suspension stroke. With single chamber air springs good linear spring rate and usable stroke typically makes up a little over half of the mechanical stroke. Usually the greater the mechanical stroke, the longer the suspension (telescopic) must be. In a single chamber air spring, the length might increase 1.5 inches for every additional inch of usable linear rate stroke. Many vehicles have suspension envelopes that do not necessarily have the length required to accommodate the stroke required for desired vehicle performance. The multi-chamber air spring allows for increased usable stroke without as much increased overall length.

Additionally, as the suspension requirements become more robust, the strength of the suspension package must increase. Again, the vehicle design envelope may not allow enough space for such an increase in conventional parallel dampers and springs. An integrated viscous damper/spring assembly reduces space requirements. As suspension stroke requirements increase and the suspension systems become correspondingly longer, it is desirable to have the characteristics of different gas spring volumes at different points in the stroke in order to maximize approximate linear and usable spring rates.

U.S. Pat. Nos. 6,105,988 and 6,311,962 show a structure of a gas spring and damper assembly and U.S. Pat. No. 6,360,857 shows a structure of a damper having some adjustable features and each of those patents are incorporated herein, in their entirety by reference.

Figure 1:
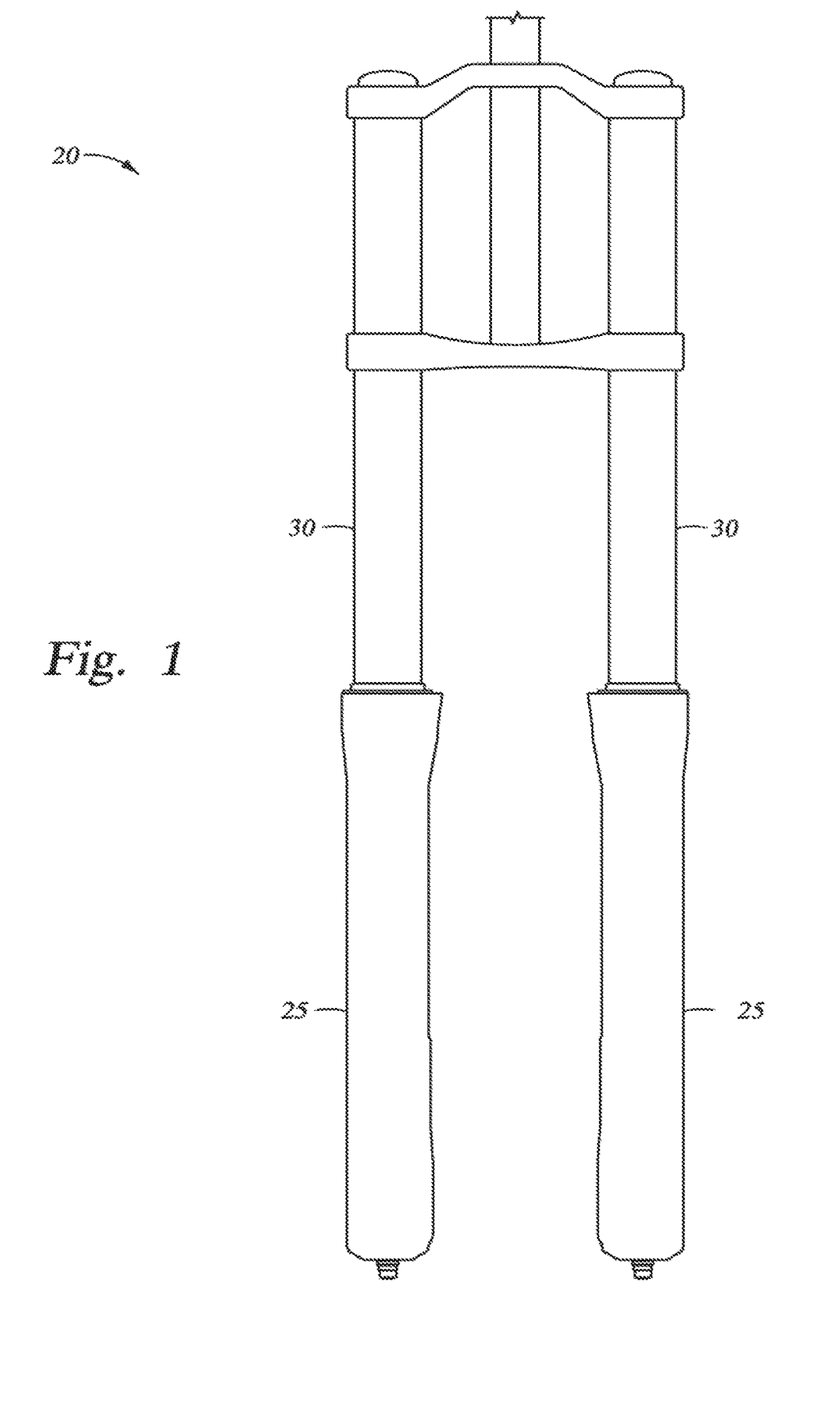
FIG. 1 is a view of a telescopic, fork-type shock absorber.

FIG. 1 is a perspective view of a telescopic, fork-type shock absorber 20 as would be found on a two wheeled vehicle like a mountain bike or a motor cycle. In the fork shown, a lower portion 25 of each leg has a telescopic relationship with an upper portion 30 and the two move towards one another as the shock absorber 20 operates. In a typical example, one of the fork legs includes a gas spring and the other includes a fluid damper.

Figure 2A:
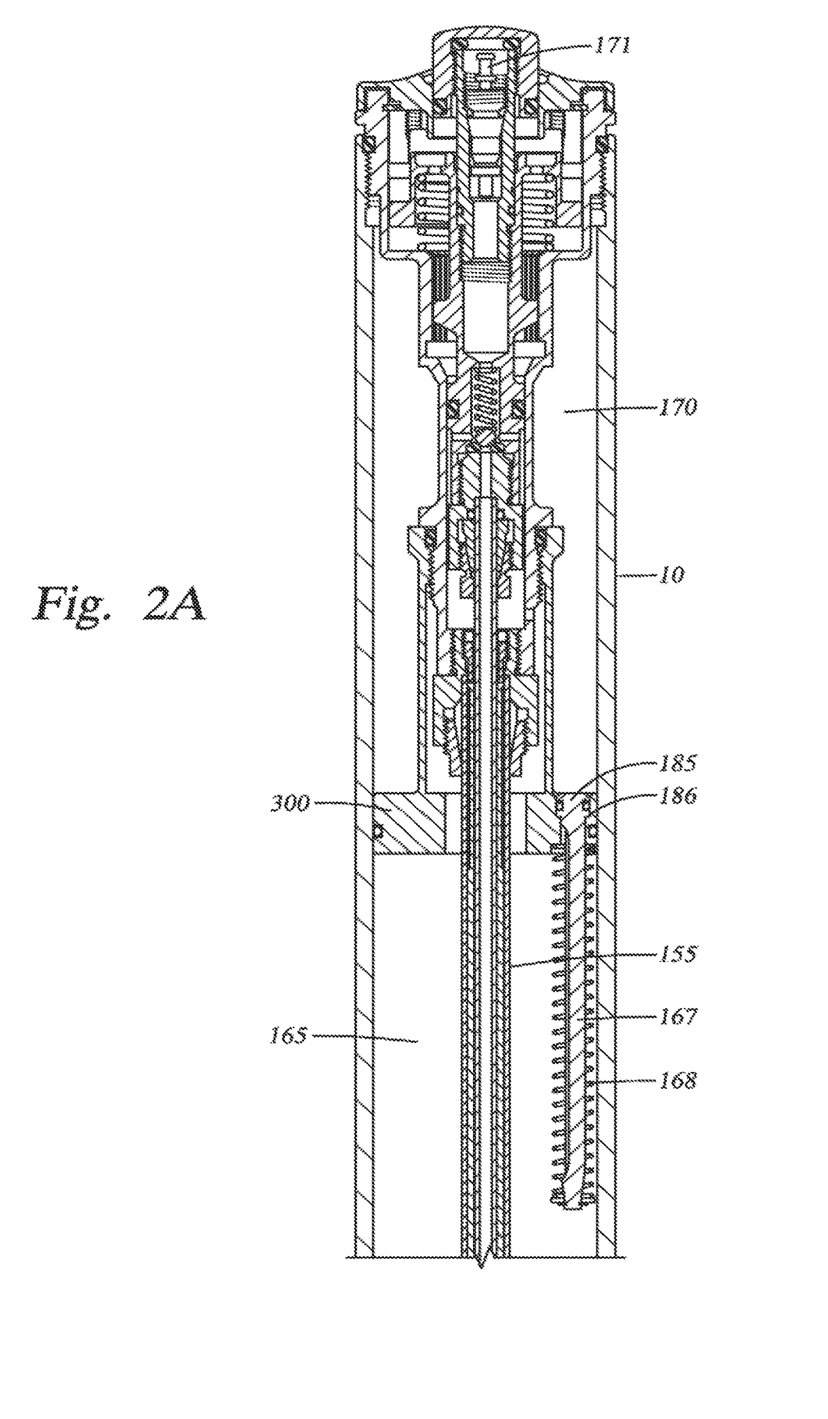
FIG. 2A is a section view of an upper portion of a shock absorber according to one embodiment and FIG. 2B is the lower portion thereof.
Figure 2B:
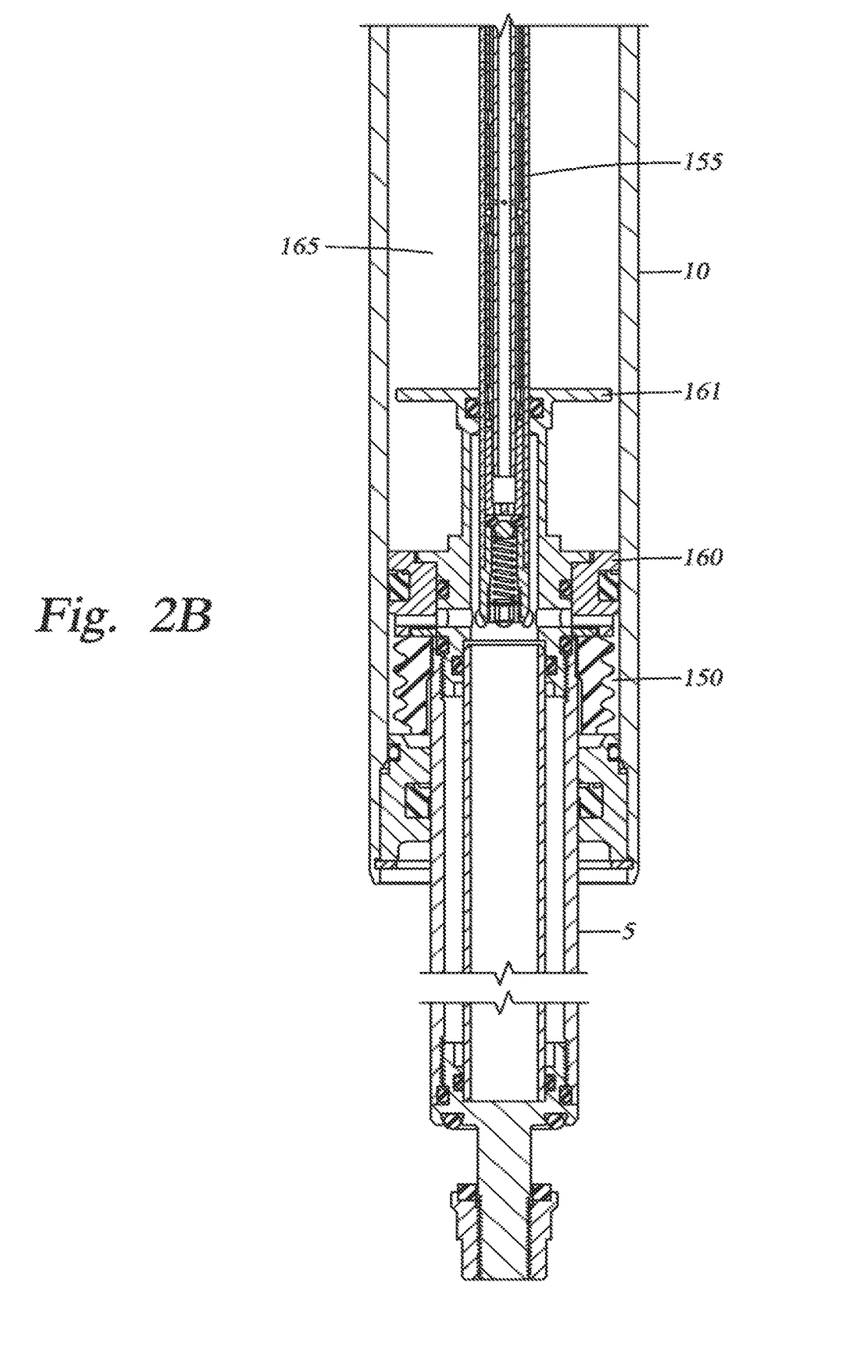
Figure 2C:
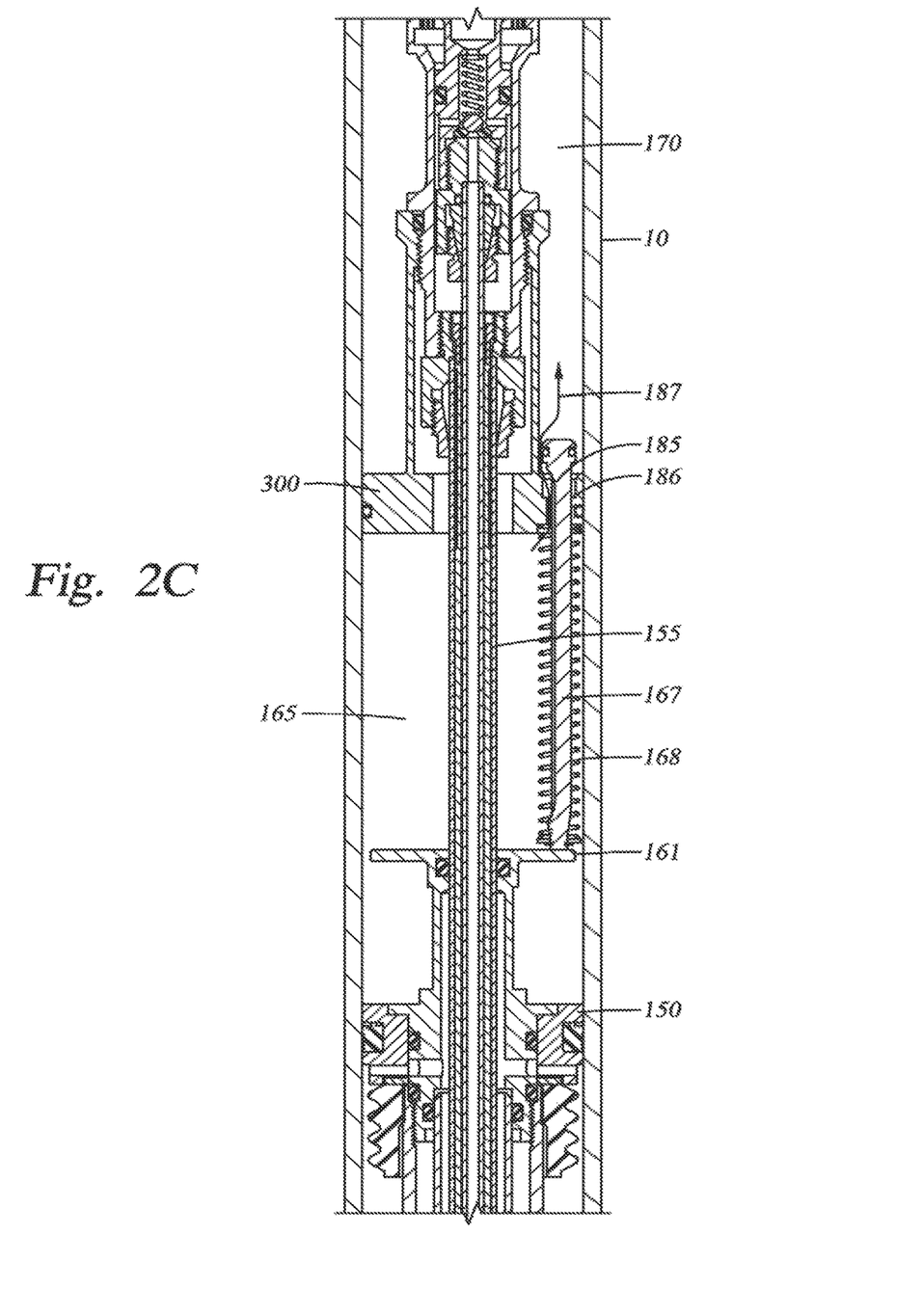
FIG. 2C is a section view of the embodiment of FIGS. 2A, B in a compressed position.

FIG. 2A is a section view of an upper portion of a shock absorber according to one embodiment and FIG. 2B is the lower portion thereof. FIG. 2C is a section view of the embodiment of FIGS. 2A, B in a compressed position. For ease of description, an outer tube covering the lower portion of the fork (visible in FIG. 1) is not shown. As with the shock absorber of FIG. 1, a lower portion of the fork body 5 extends into an upper portion 10 as the shock absorber operates. Included is a fill valve 171 located at an upper end of the leg and usable to fill a first gas spring chamber 165 via an internal fluid path through an upper portion of the leg. The first gas spring chamber 165 is separated from a second gas spring chamber 170 by a bulkhead 300.

Referring to the Figures, as the lower fork body 5 moves in compression, carrying a gas compression piston 160 correspondingly further into the upper tube 10, the volume of the first gas spring chamber 165 is reduced, thereby compressing or further compressing the gas in the first gas spring chamber 165. In the embodiment shown, a communication valve 185 is disposed at the upper end of a communication valve shaft 167. The valve, which is normally closed due to a biasing member or spring 168, opens upon the application of an axial force to shaft 167, to allow communication between the first gas spring chamber 165 and the second gas spring chamber 170. In one embodiment the axial force is supplied by contact with the moving compression piston 160. Valve 185, with its seal ring (e.g. O-ring) blocking a fluid path through a valve seat 186, is shown in FIG. 2A.

In one embodiment, the gas pressure in the first gas spring chamber 165 continues to increase until a top portion 161 of the gas compression piston 160 impinges upon the lower end of the communication valve shaft 167. The force exerted by the gas compression piston 160 on the lower end of the communication valve shaft 167 moves the valve 185 off of the valve seat 186, thereby opening a fluid flow path 187 through valve seat 186 and between the first gas spring chamber 165 and the second gas spring chamber 170. As a result of the fluid communication between the two gas spring chambers 165, 170, any pressure differential between the chambers equalizes. Additionally, the effective volume of the shock absorber gas spring is increased over the volume of the first gas spring chamber 165 by the volume of the second gas spring chamber 170.

In the air spring shock absorber disclosed herein there are several parameters that can be varied in order to derive a preferred travel versus pressure (i.e. force) profile, or "spring rate" profile over the range of travel. Variables that may be selectively altered include: length and diameter of the first chamber 165, volume of the second chamber 170, initial pressure state of the first chamber 165, initial pressure state of the second chamber 170, and length and/or position of the communication valve shaft 167. In one embodiment, piston areas of a pressure divider and initial check valve spring load may be varied.

The initial pressure state and the diameter of the first chamber 165 define the shape of the travel versus spring pressure profile for the shock absorber prior to opening the communication valve 185. The location, along the travel, of the opening of the valve 185 determines when the spring force/travel curve of the first chamber alone is altered and combined characteristically with the second, or additional, chamber(s). Preferably, the values chosen for those variables result in a substantially linear spring rate prior to, and following, fluid communication between the chambers 165, 170.

In one embodiment, the initial pressure in the second chamber 170 is set to equal a pre-calculated pressure in the first chamber 165 corresponding to a point just before the gas compression piston 160 contacts the lower end of the communication valve shaft 167. When the communication valve 185 is opened with such a second chamber 170 pressure setting, there is no significant differential pressure, at that point, between the first and second chambers 165, 170, and hence the force versus travel curves before and after are blended together at the transition. Further, there is no significant system pressure drop when the first and second chambers 165, 170 are fluidly communicated. The gas spring volume is increased by the amount of the second chamber 170 and the spring rate is correspondingly decreased. However, the transition from the spring rate associated with only the first chamber 165 to the spring rate associated with the combined chambers 165, 170 is relatively smooth (in one embodiment to the point where the combined volumes produce a spring rate approximating a constant).

Alternatively the initial pressure in the second chamber 170 may be set at the same pressure (and time) as the initial (fully extended) pressure in the first chamber 165. During an initial compression of the shock absorber the volume of the first chamber 165 is reduced and the pressure in the first chamber 165 rises until the communication valve 185 is opened. Because the second chamber 170 pressure is still at its initial (and now lower) pressure setting, fluid flows from the first chamber 165, through the communication valve 185 and into the second chamber 170 when valve 185 is opened. The pressure in the now-combined first and second chambers 165, 170 equalizes at a pressure value somewhere between the pre-communication first chamber pressure and the initial second chamber pressure (the equalization pressure depends on the relative volumes of the first and second chambers 165, 170 and the first chamber displacement that occurs prior to equalization). During subsequent compression cycles of the shock absorber, the second chamber 170 retains the compression pressure of the first chamber 165 as a set point and no further equalization occurs upon opening of the communication valve 185. Optionally, a one-way valve (e.g., check valve not shown) is separately included between the chambers (see description of embodiment of FIG. 4) and permits communication from the second to the first chamber during rebound. In this manner, compressed gas is allowed to escape from the second to the first chamber upon extension of the shock absorber, thereby resetting the second chamber to a lower pressure, the pressure determined by the characteristics of a spring-biased check valve (e.g. higher spring bias equals greater retained differential pressure where lower bias equals more equalization), for example.

It may be desirable to select the point in the travel at which the first 165 and second 170 chambers are communicated. In one embodiment, the communication valve shaft 167 is available in different lengths. A user may install a longer length valve shaft 167 for communication earlier in the shock compression stroke or a shorter length for communication later in the shock stroke. In one embodiment the initial travel setting of the fork leg is adjustable hence the distance into the travel where the valve shaft 167 is contacted.

In the embodiment shown in FIGS. 2A-C, the communication valve 185 and shaft 167 are not coaxial with the center line of the shock absorber, thereby allowing a travel adjust support shaft 155 to be coaxially located. The travel adjust support shaft 155 includes control mechanisms through or around the shaft 155 for selectively adjusting and/or blocking valves or orifices of the air spring assembly to effect changes in travel setting (see description of embodiment of FIG. 2D). The travel adjust assembly is preferably mounted on a coaxial (with the fork leg) shaft to minimize any bending and binding of the piston assembly during use.

The air spring is intended in some embodiments to be utilized in a shock absorber system that includes a damper and the operation of the first and secondary chambers permit the damper to operate in its most effective way over the course of the shock's operation. For example, a damper is most effective during the linear part of the gas spring curve when, depending upon the speed at which the shock is operating, the damper meters fluid from one side of a piston assembly to the other, effectively absorbing (ultimately converting it to heat and dissipating it) energy. During the nonlinear (exponentially increasing spring stiffness) part of the spring curve, the damper provides less or virtually no damping action since the shock has become so stiff that movement of the shock is limited and the damper is unable to meter significant fluid.

In one embodiment the fork includes a damper lock which substantially prevents fluid transfer from taking place within a portion of the damper. The lock is configured so that the damper becomes substantially rigid when the fluid transfer path is blocked. Such a feature allows a user to selectively lock the fork into a substantially rigid configuration in order to minimize "pedal bob" or other vehicle power dissipation due to unwanted fork compression under power. Even when locked there is the possibility that a disparity in the terrain will require activation of the shock to prevent damage to the shock and/or vehicle. For that reason the shock having a damper lock as described may also be equipped with a blow off feature. One such damper lock/blow off feature is described in U.S. Pat. No. 7,163,222 which patent is incorporated herein by reference in its entirety. In one embodiment, the dual chamber air spring is used with a damper having an adjustable blow-off feature. The blow off feature is an automatic override permitting the damper in a "locked out" shock absorber to operate and meter fluid if subjected to a rapid shock event, like a sudden, abrupt bump in a road.

With the dual gas chambers, a suddenly operated or "blown off" damper will be more likely to be operating in a linear portion of the spring curve.

In one embodiment, a travel adjust is intended to permit a user to adjust the length of the air spring stroke in addition to opening the second chamber. As shown in FIGS. 2B, C, in addition to the first and second gas spring chambers 165, 170, there is a negative gas chamber 150. Pressure in the negative chamber 150 acts on surface areas generally opposed to those of the gas compression piston 160. In one embodiment the surface areas of the negative piston and the gas compression piston 160 are equal and the otherwise unloaded fork spring is at pressure equilibrium when the pressure in the (main) first gas spring chamber 165 is equal to the pressure in the negative gas chamber 150. Depending on the relative surface areas of the negative piston and the gas compression piston 160, the equilibrium pressures in the first gas spring chamber 165 and the negative gas chamber 150 may vary (e.g. be unequal).

Figure 2D:
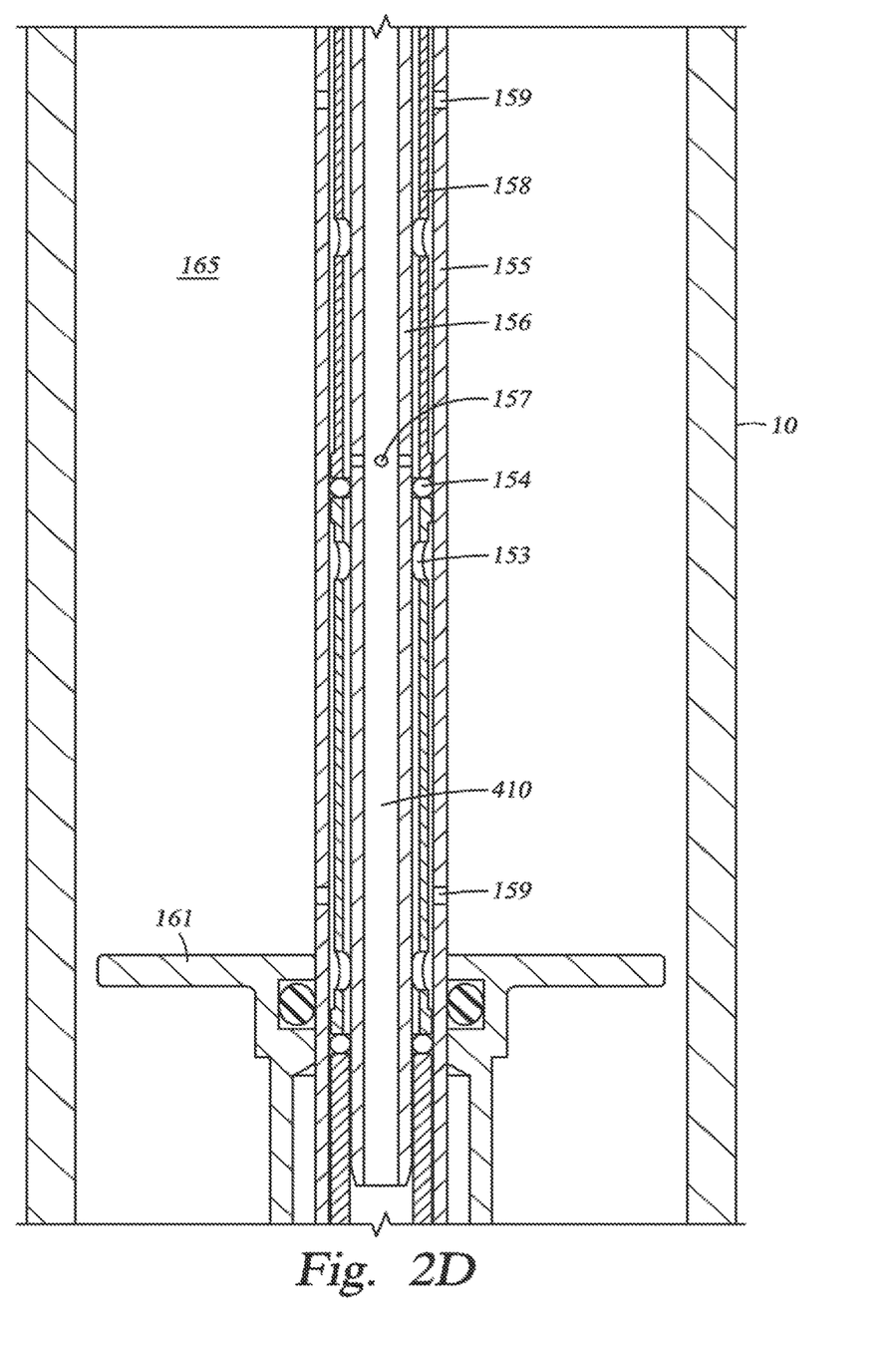
FIG. 2D is a section view illustrating a feature utilizing a negative gas chamber.

FIG. 2D illustrates one embodiment wherein shaft 155 includes a concentrically mounted tube set 156, 155 therein, the tubes having various apertures through their walls with seals positioned between certain of the apertures. The innermost tube 156 is axially moveable relative to the other tubes and in one embodiment is adjustable by means of a knob on top of the fork leg (not shown). The tube set, by means of the apertures is capable of communicating pressure from the main chamber 165 to the negative chamber 150 via an inner flow path 410 of the innermost tube 156 where the inner flow path 410 is in communication at a lower end thereof with the negative spring chamber 150. Depending on which apertures are adjusted to perform the communication function, and the axial location of those apertures along the tube set, the upper tube 10, and hardware attached to it, will settle in equilibrium at different axial positions (corresponding to different travel settings) relative to the lower body 5 and the lower fork leg (not shown).

In the example illustrated by FIG. 2D, apertures 157 in innermost tube 156 are located just above an O-ring 154 that seals an annulus between the tubes. In this setting, gas from main chamber 165 enters outer tube 158 at apertures 159 and travels in an annular space between the outer 158 and intermediate 158 tubes until it enters intermediate tube through apertures 153. Thereafter, the gas enters the innermost tube through apertures 157. Once in the innermost tube, the gas travels down to the negative chamber 150 where it equalizes the pressure therein with that of the main chamber 165. In another setting, the apertures of innermost tube are located just below the O-ring. In this position gas reaching the apertures 157 of innermost tube 156 can only travel from a lower set of apertures 159 on the outer tube 155. Once the piston, with its seals, moves across the apertures 159, equalization is no longer possible.

Figure 3A:
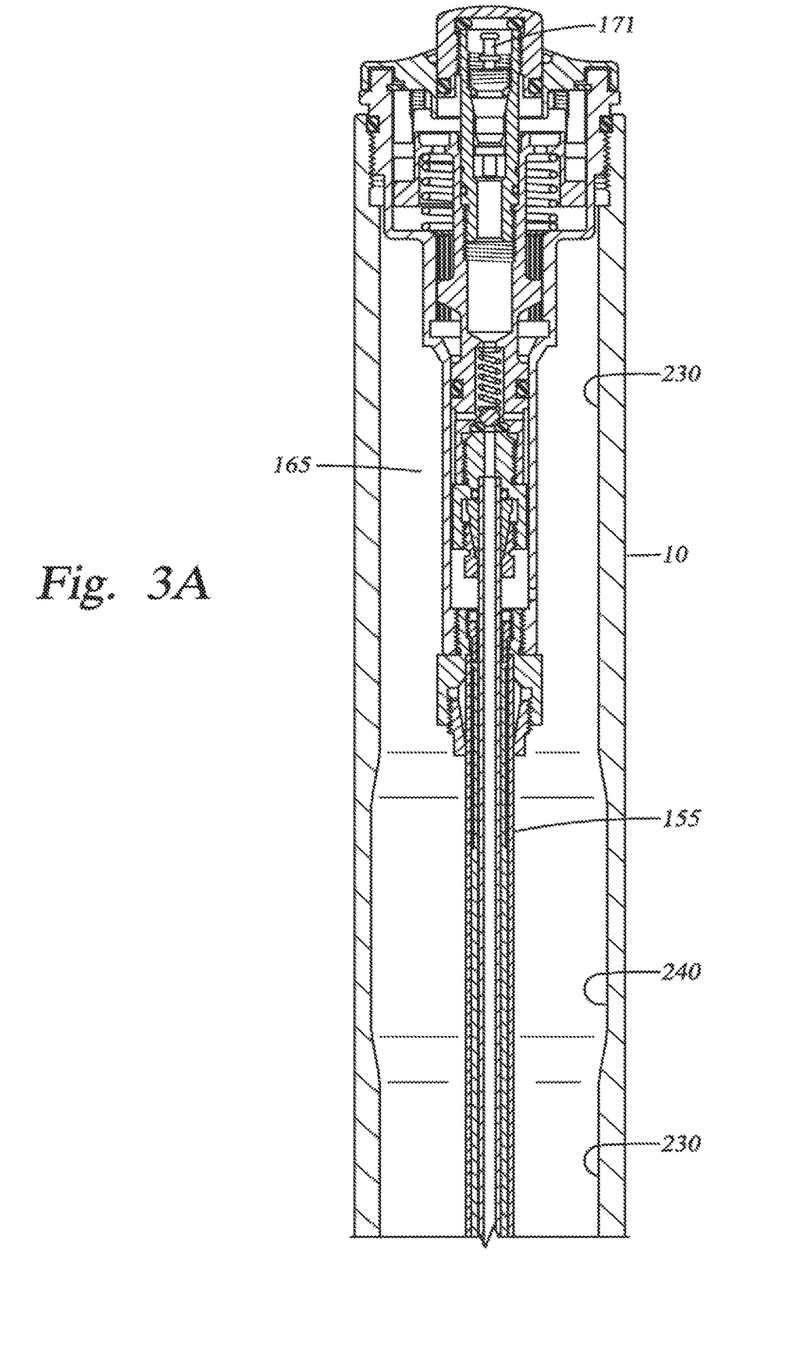
FIG. 3A is a section view of an upper portion of a shock absorber according to another embodiment and FIG. 3B is the lower portion thereof.
Figure 3B:
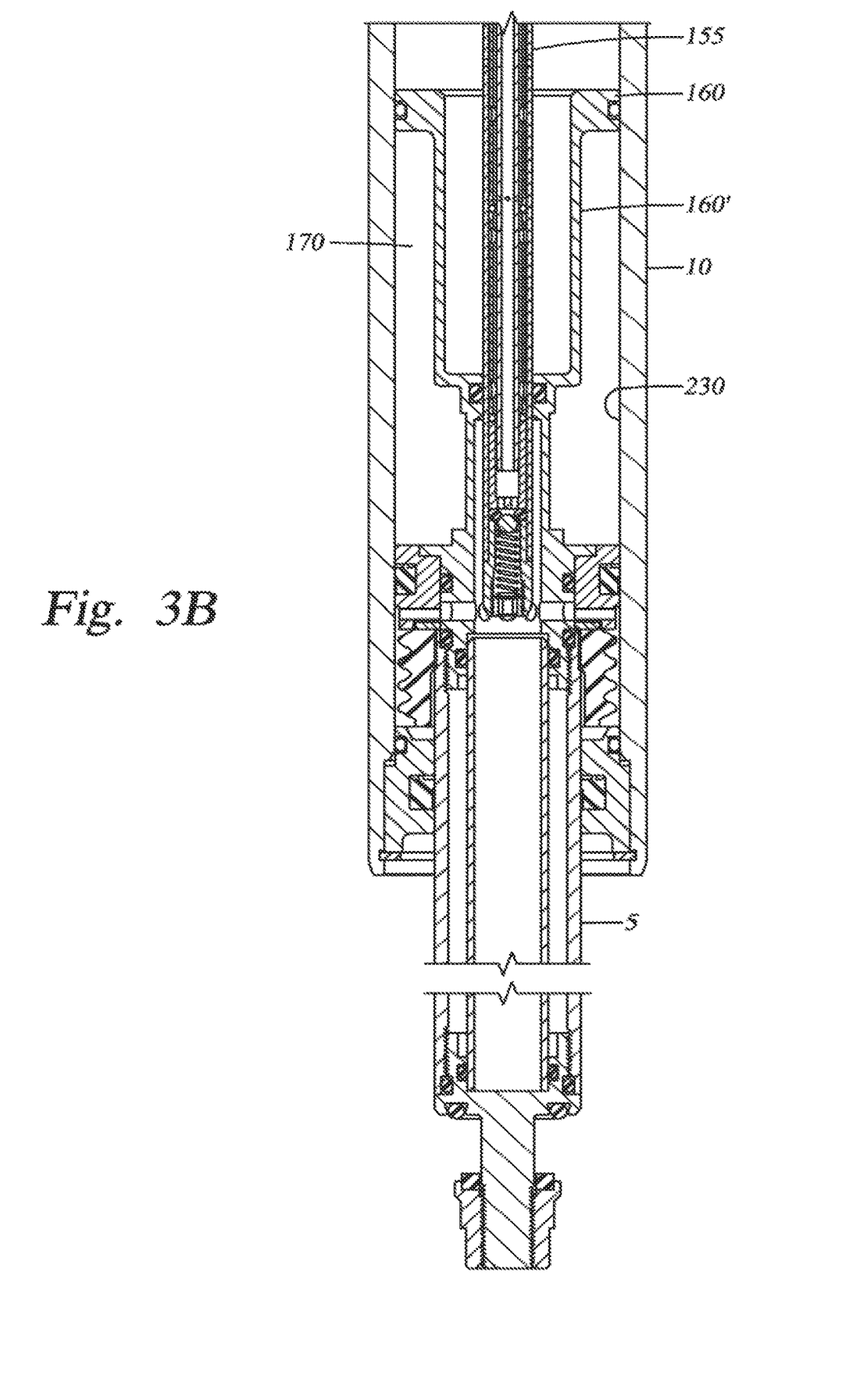
Figure 3C:
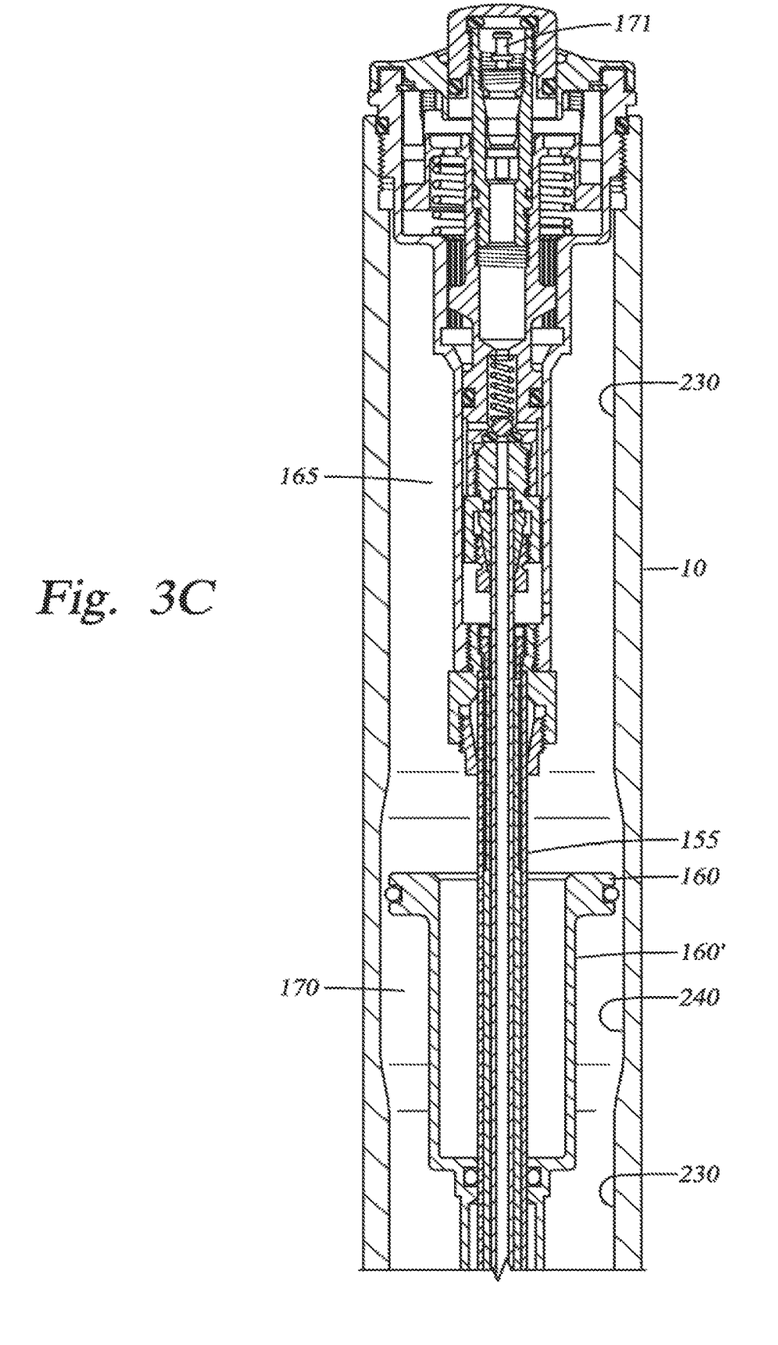
FIG. 3C is a section view of the embodiment in a compressed position.

FIG. 3A is a section view of an upper portion of another embodiment, and FIG. 3B is a lower portion thereof. FIG. 3C is a section view of the embodiment in a compressed position. Shown in FIGS. 3A-3C is an embodiment having travel adjust as described above (and shown) and a by-pass valve type of communication mechanism between a primary gas chamber and a secondary gas chamber. Like the embodiment of FIGS. 2A-C, an outer tube housing the lower body 5 of the fork is not shown. FIG. 3B shows the lower body 5 carrying the gas compression piston 160, telescopically positioned within the upper fork tube 10. Compression of the fork leg causes the body 5 to move further up into the upper tube 10 thereby compressing the gas in main chamber 165. The upper tube includes two differing internal diameters: the primary diameter 230 and a by-pass diameter 240. The by-pass diameter 240 is located at an axial location within the upper tube 10 corresponding to a point during compression where the gas compression curve in the tube (due to remaining volume) is beginning to get steep relative to incremental increases in compressive travel (e.g., the diameter 240 may begin at the 50% compression point).

The gas compression piston 160 includes a housing 160' that forms a portion of the enclosure isolating the secondary gas chamber 170 (the remainder of the enclosure is formed by diameter 230) from the main chamber 165. When the seal of piston 160 enters the by-pass diameter 240 (as shown in FIG. 3C), the additional volume of the secondary chamber 170 is comingled with the main chamber 165 and a corresponding drop in gas compression rate can occur. Optionally (and as shown), the by-pass diameter 240 reduces closer to the top of the main chamber 165 and during extensive compression the seal of the upper piston 160 will engage upper diameter 230, thereby re-isolating the main chamber 165 from the secondary chamber 170. Such option provides increased compression rates near the end of the stroke to avoid harsh suspension bottom out (i.e. gas cushion provided).

In summary, during a first portion of a compression stroke, the main chamber 165 includes that portion of upper tube 10 above piston 160, which is sealed against a wall of tube 10 via O-rings. However, when the piston 160 enters the bypass diameter 240, the second chamber 170, which is a fixed volume chamber, is exposed to the main chamber 165.

Figure 4:
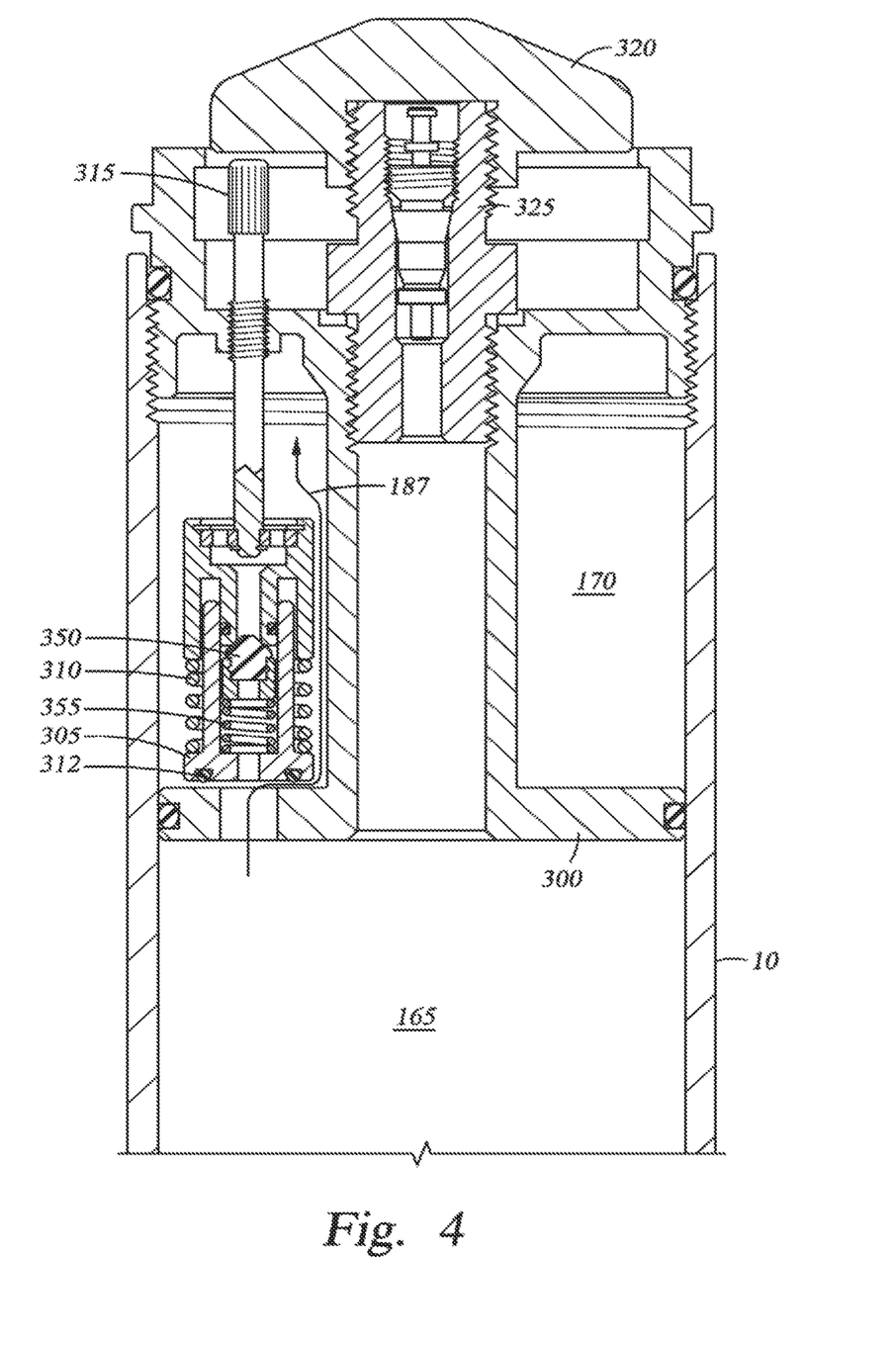
FIG. 4 is a section view of another embodiment, shown in an open position.

FIG. 4 is a section view of another embodiment, shown in an open position. In the embodiment of FIG. 4, operation of the shock absorber is pressure, rather than position sensitive. FIG. 4 illustrates the device in an "open" position, permitting communication between two chambers 165 and 170 as shown by arrow 187. The figure shows the upper portion 10 of a fork leg corresponding generally to FIGS. 3A and B. As is typical, the fork includes a threaded cap member 320 and a valve 325 for filling main chamber 165. As shown, the secondary gas chamber 170 is included in a generally annular space within the upper tube 10 and above a sealed bulkhead 300. A valve 305 is biased normally closed by a spring 310. At a lower end of the valve a piston surface 312 is formed. When pressure in the main chamber 165 reaches a preset valve "cracking" pressure, the volume of the secondary chamber 170 is comingled with that of the main chamber 165. The compression placed on spring 310 (and acting against the pressure in chamber 165 is preset by a user-operable adjustment rod 315 which is threaded and designed to move axially downward in order place the spring 310 in compression, thereby raising the pressure at which the valve operates. In order to permit pressurized gas to return to the main chamber 165, the assembly includes a second, one way valve 350 with a second spring 355. When valve member 350 is displaced by pressure it opens permitting gas to flow in to the main chamber 165.

The fill valve and shock absorber/fork shown and disclosed in the Figures herein include o-ring seals as shown and where appropriate. Any suitable seals may be used and seals may be used where not shown or omitted even though shown in any case as appropriate for the channeling and retention of pressurized fluids.

The dual chamber arrangement described herein permits the linear portion of the spring curve to continue through a greater range of shock travel and delays the less desirable non-linear portion, thereby resulting in an improved overall shock absorber function including damping.

While the invention has been described with only a first and second chambers, the invention can be used with three or more separate chambers, each designed to operate together in a sequential fashion. For example, by arranging valves in a sequential manner, a first auxiliary chamber can be utilized based upon a first pressure or position of the components in a compression stroke. Thereafter, based upon a second pressure or position, a third chamber can be opened in a manner that all three chambers operate as one.

While the foregoing is directed to embodiments of the present invention, other and further embodiments of the invention may be devised without departing from the scope thereof, and the scope thereof is determined by the claims that follow.

What we claim is:

1. A pressure-sensitive shock absorber for a vehicle comprising:
    a gas spring having a main gas chamber and a secondary gas chamber, said secondary gas chamber separated from said main gas chamber by a sealed positionally-fixed bulkhead, a volume of said secondary gas chamber not altered by movement of said pressure-sensitive shock absorber;
    a first valve disposed along a first fluid path coupling said main gas chamber and said secondary gas chamber, said first valve having an open position which allows fluid to flow from said main gas chamber to said secondary gas chamber when a pressure in said main gas chamber reaches a preset pressure, said first valve having a closed position which prevents said fluid from flowing from said main gas chamber to said secondary gas chamber;
    a user-operable adjustment rod coupled with said first valve, said user-operable adjustment rod configured to control a compression placed on said first valve to select said preset pressure; and
    a second valve disposed along a second fluid path coupling said main gas chamber and said secondary gas chamber, said second valve having an open position which allows said fluid to flow from said secondary gas chamber to said main gas chamber, said second valve having a closed position which prevents said fluid from flowing from said secondary gas chamber to said main gas chamber, said main gas chamber and said secondary gas chamber operable in combination to increase a range travel for said pressure-sensitive shock absorber during which said pressure-sensitive shock absorber achieves a linear portion of a spring curve.

2. The shock absorber of claim 1 wherein said secondary gas chamber has an annular shape.

3. The shock absorber of claim 1 further comprising:
    a spring coupled with said first valve and said user-operable adjustment rod, said spring biasing said first valve in said closed position.

4. The shock absorber of claim 3 wherein said user-operable adjustment rod controls an amount of compression applied to said spring.

5. The shock absorber of claim 1 further comprising:
    a spring coupled with said second valve, said spring biasing said second valve in said closed position.

6. The shock absorber of claim 1 wherein said first valve and said second valve are integrated into a common assembly.

7. The shock absorber of claim 1 wherein said first valve at least partially surrounds said second valve.

8. A pressure-sensitive air shock comprising:
    a main gas chamber at a first pressure;
    a secondary gas chamber at a second pressure, said secondary gas chamber separated from said main gas chamber by a sealed positionally-fixed bulkhead, a volume of said secondary gas chamber not altered by movement of said pressure-sensitive air shock;
    a first valve disposed along a first fluid path coupling said main gas chamber and said secondary gas chamber, said first valve having an open position which allows fluid to flow from said main gas chamber to said secondary gas chamber, said first valve having a closed position which prevents said fluid from flowing from said main gas chamber to said secondary gas chamber, said first valve moving to said open position provided said first pressure reaches a sufficient pressure difference with respect to said second pressure;
    a user-operable adjustment rod coupled with said first valve, said user-operable adjustment rod configured to control a compression placed on said first valve to adjust a value of said pressure difference at which said first valve moves from said closed position to said open position; and
    a second valve disposed along a second fluid path coupling said main gas chamber and said secondary gas chamber, said second valve having an open position which allows said fluid to flow from said secondary gas chamber to said main gas chamber, said second valve having a closed position which prevents said fluid from flowing from said secondary gas chamber to said main gas chamber, said main gas chamber and said secondary gas chamber operable in combination to increase a range travel for said pressure-sensitive shock absorber during which said pressure-sensitive shock absorber achieves a linear portion of a spring curve.

9. The air shock of claim 8 wherein said secondary gas chamber has an annular shape.

10. The air shock of claim 8 further comprising:
    a spring coupled with said first valve and said user-operable adjustment rod, said spring biasing said first valve in said closed position.

11. The air shock of claim 10 wherein said user-operable adjustment rod controls an amount of compression applied to said spring.

12. The air shock of claim 8 wherein said sufficient pressure difference between said first pressure and said second pressure is preset.

13. The air shock of claim 8 wherein said second valve moves to said open position provided said second pressure reaches a pressure difference with respect to said first pressure.

14. The air shock of claim 8 further comprising:
    a spring coupled with said second valve, said spring biasing said second valve in said closed position.

15. The air shock of claim 8 wherein said first valve and said second valve are integrated into a common assembly.

16. The air shock of claim 8 wherein said first valve at least partially surrounds said second valve.

* * * * *